US005641550A

United States Patent [19]

Berman et al.

[11] Patent Number: 5,641,550

[45] Date of Patent: Jun. 24, 1997

[54] NOTE PAD

[76] Inventors: Rod S. Berman, 30724 Mainmast Dr., Agoura Hills, Calif. 91301; Michael M. Gerardi, 3372 Olive St., Huntington Park, Calif. 90255

[21] Appl. No.: 251,872

[22] Filed: Jun. 1, 1994

[51] Int. Cl.[6] .................... B32B 7/14

[52] U.S. Cl. .................... 428/40.9; 40/299; 281/2; 281/5; 281/44; 428/42.2; 428/42.3; 428/194; 428/202; 428/209; 428/212; 428/214; 462/72

[58] Field of Search .................... 428/40, 194, 202, 428/209, 212, 214, 220; 40/299; 281/2, 5, 44; 462/72

[56] References Cited

U.S. PATENT DOCUMENTS

| | | | |
|---|---|---|---|
| 4,950,517 | 8/1990 | Loggins | 428/40 |
| 5,286,546 | 2/1994 | Su | 428/194 |
| 5,318,825 | 6/1994 | Naber | 428/40 |
| 5,342,665 | 8/1994 | Krawitz | 428/40 |
| 5,350,612 | 9/1994 | Stern | 428/40 |
| 5,390,819 | 2/1995 | Kaye | 428/40 |

OTHER PUBLICATIONS

Catalog "Nova", p. 8, item:SN-50, Stickems Notepad (1990).

*Primary Examiner*—Nasser Ahmad

[57] ABSTRACT

An article of manufacture, such as a note pad, contains a plurality of sheets including an upper sheet and a lower sheet. The sheets are releasably bonded together by a first adhesive applied over least a portion of the adjacent surfaces of the sheets. A second adhesive is applied over at least a portion of the surface of the bottom sheet opposite the surface to which the first adhesive is applied. The second adhesive has a peel strength greater than the first adhesive.

11 Claims, 1 Drawing Sheet

NOTE PAD

FIELD OF THE INVENTION

The present invention relates to an improved article of manufacture, such as a note pad, comprising a plurality of sheets bonded together over at least a portion of their surfaces using an adhesive. The present invention also relates to a method for producing the improved article, and in particular to a method of taking notes using the improved article.

BACKGROUND OF THE INVENTION

Note pads such as the "Post-it"® (3M) have achieved wide commercial success. These articles comprise a plurality of paper sheets releasably bonded together by an adhesive strip along the top back of each sheet. Each sheet can be attached repeatably to articles such as books, newspapers, photographs, etc. without damage to the articles when the sheets are removed.

A problem with such articles, however, is that they are easily misplaced. In particular, small (e.g., 1.5×2") note pads are often swept from desk surfaces or otherwise displaced or lost.

A need has existed for an article, such as a note pad, which can be affixed to a surface, such as a desk top. The article should be capable of easy removal from the surface without damage to the surface. The article should also be affixable to the surface sufficiently strongly to enable sheets to be removed without dislodging the remainder of the article from the surface to which it is affixed.

SUMMARY OF THE PREFERRED EMBODIMENTS

In accordance with one aspect of the present invention, there has been provided an article of manufacture comprising a plurality of sheets. The sheets include at least an upper sheet and a lower sheet, and are releasably bonded together by a first adhesive applied over least a portion of their adjacent surfaces. The article further comprises a second adhesive applied over at least a portion of the surface of the bottom sheet opposite the surface to which the first adhesive is applied. The second adhesive has a peel strength greater than the first adhesive.

In a more specific aspect of the present invention, the first and second adhesives are pressure-sensitive adhesives.

In a preferred embodiment, the article further comprises a substrate which is releasably bonded to the bottom sheet by the second adhesive. The substrate can be comprised of paper, preferably a paper sheet having substantially the same length and width as the plurality of sheets. The substrate can also be comprised of another material such as plastic, wood, metal, etc.

In accordance with another aspect of the present invention, there has been provided a method of producing the foregoing article. The plurality of sheets are bonded together over at least a portion of their adjacent surface areas using a first adhesive. Then a second adhesive, which has a peel strength greater than the first adhesive, is applied to the surface of the bottom sheet opposite the surface to which the first adhesive is applied.

In accordance with still another aspect of the present invention, there has been provided a method of taking notes. An article as described above is releasably bonded to a surface, and a readable symbol is produced on the top sheet of the article. The top sheet can then be removed if desired.

Preferably, the surface to which the article is bonded is a work surface, such as a table or desk.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWING

The invention may be more readily understood by referring to the accompanying drawings in which.

DETAILED DESCRIPTION OF THE PREFERRED EMBODIMENTS

Figure 1:
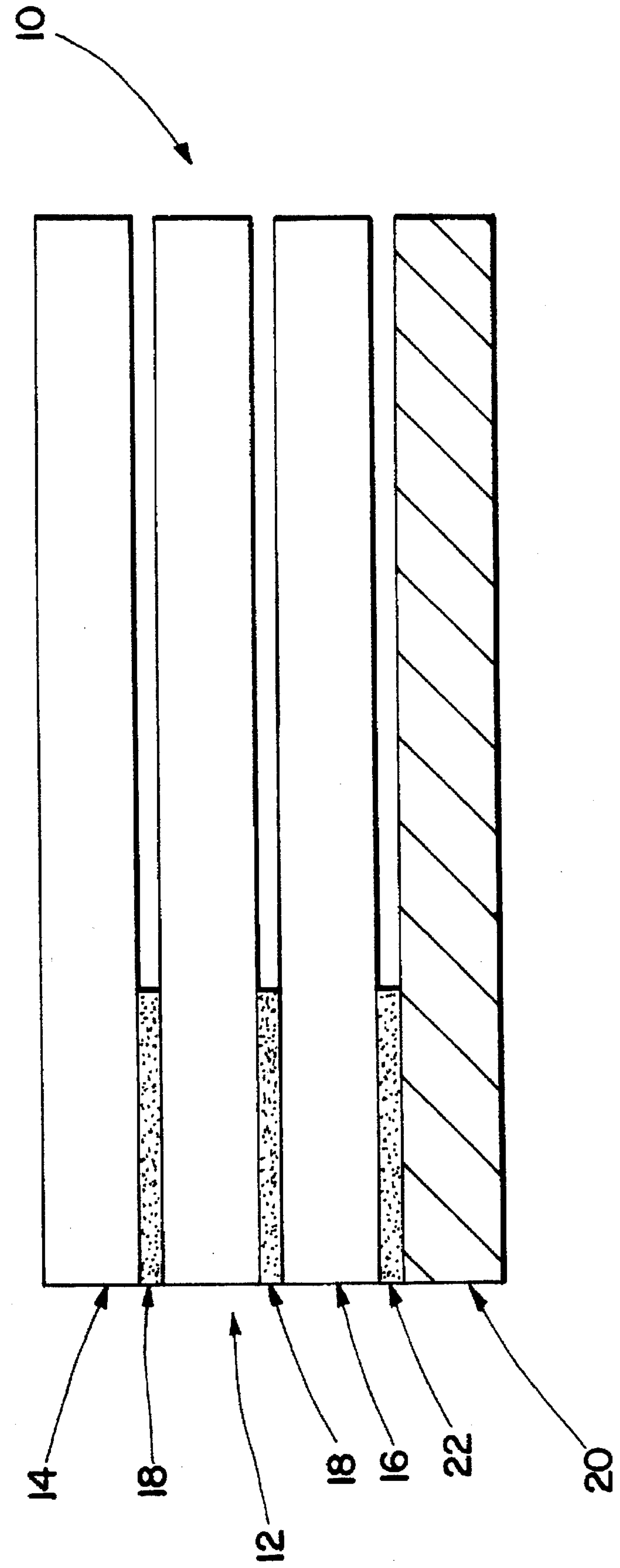
FIG. 1 is a cross-sectional view of a preferred embodiment of an article of manufacture according to the present invention, showing the relationship between the plurality of sheets, the first and second adhesives, and the substrate.

The use of two different adhesives with different peel strengths enables an article of manufacture according to the invention, such as a note pad, to be affixed to a substrate, such as a desk top, and to remain in place while sheets are removed for use. The article is thus always available for use. When the bottom sheet of the plurality of sheets is reached, it can be used in the same manner as the other sheets, or disposed of.

The term "peel strength" (also known as "peel adhesion") as used herein denotes the force required to remove an adhesive from a specified surface at a specified rate of peel. This force depends on a number of factors, such as the angle of peel, the rate of pulling, the roughness and surface energy of the surface, the pressure with which the adhesive is applied to the surface, and the nature of the adhesive backing. Peel strength is typically expressed as grams (or ounces) per inch width of bond line.

It is important that the conditions of peel be the same for all adhesives tested. Standard testing procedures for peel strength include ASTM (American Society for Testing and Materials) test D930.

Any adhesive which does not harm the surface to which it is applied (i.e., remove material from the surface, cause tearing or leave a readily detectable residue) is contemplated for use according to the instant invention. Preferred are pressure-sensitive adhesives, that is, materials which, in dry form, are permanently tacky at room temperature and adhere without need for more than finger or hand pressure. Many pressure-sensitive adhesives suitable to bond paper to various materials, such as paper, plastic, metal or wood, are known. See, e.g., International Plastics Selector, D.A.T.A. Digest, Edition 5, 1989, which is incorporated herein by reference.

Particularly preferred are the adhesives typically used in "Post-it"® notes. These adhesives are disclosed in U.S. Pat. No. 3,857,731, the disclosure of which is incorporated in its entirety herein by reference. The second adhesive preferably has a peel strength at least 150% that of the first adhesive, particularly 150% to 500% that of the first adhesive. Very preferably, the second adhesive retains sufficient peel strength after multiple release and re-bonding to maintain bonding with a substrate over the life of the article, i.e., until the bottom sheet is reached. As a preferred example, the peel strength of the second adhesive after 100 peels should be at least 125% of the peel strength of the first adhesive.

A preferred embodiment of the article of the instant invention includes a substrate releasably bonded to the bottom sheet of the plurality of sheets by the second adhesive. The substrate can be a paper substrate (a "backing sheet") which is bonded to the plurality of sheets prior to packaging the article for sale. Such a backing sheet can preferably be of substantially the same width and length as the plurality of sheets. The backing sheet can be comprised of the same type of paper as the plurality of sheets, or can be a different type of paper. It can also be thicker, thinner or of the same thickness as the individual sheets of the plurality of sheets.

Alternatively, the substrate can be comprised of a different material, such as plastic, wood, metal, etc. For example, a plastic surface can be provided to which the plurality of sheets are releasably bonded by the second adhesive. The plastic base can be separate, or can be part of a larger article such as a desk organizer.

The plastic, wood or metal surface can also be formed by the surface of an article of furniture, in particular a desk or table. In this embodiment, the inventive article is simply affixed to the surface of the desk or table by the second adhesive. The article remains in place while the individual sheets of the plurality of sheets are used or removed for use. When the bottom sheet is removed, preferably no residual adhesive remains on the surface.

A method of taking notes according to the instant invention can be carried out as follows. An article as described above is releasably bonded to a surface. The surface can be any desired surface, such as the desk or table mentioned above, a household appliance such as a refrigerator, a doorway or any other surface. A readable symbol is next produced on the top sheet of the article. The term "readable symbol" denotes any tangible symbol capable of being visually perceived by a human or machine. The symbol can be produced, for example, by handwriting, hand printing, stamping, affixing an adhesive article such as a stamp, or by any other means by which information can be conveyed to a human or machine reader. The top sheet bearing the symbol can then be removed if desired. The method can be repeated until all sheets of the article have been utilized.

Referring now to the drawings, in FIG. 1 an article of manufacture 10, here a note pad, includes a plurality of sheets 12 including top sheet 14 and bottom sheet 16. The plurality of sheets can be comprised of a material such as paper, which can be blank or printed over at least a portion of its surface. The plurality of sheets 12 are releasably bonded together by means of first adhesive 18 applied between the sheets 12 over at least a portion of their adjacent surfaces, such as in a strip along one side thereof. The plurality of sheets 12 are in turn releasably bonded to substrate 20 by means of second adhesive 22. Substrate 20 can be a material such as paper (i.e., a backing sheet), plastic, wood, metal, etc. Second adhesive 22 is preferably applied over an area of bottom sheet 16 corresponding to the areas to which first adhesive 18 is applied, but can be in a different, greater or lesser area if desired.

Preferably, the plurality of sheets 12 are of substantially the same width and length, and in turn substrate 20 is of substantially the same width and length as the plurality of sheets 12. The dimensions of the sheets 12 and substrate 20 can be varied as desired, however.

Non-limiting examples of first and second adhesives useful according to the instant invention are given below. The adhesives of Examples 4 and 6–11 of U.S. Pat. No. 3,857,731 are prepared and are designated as adhesives (a)–(g) herein. Peel strengths of the adhesives after 1 and 100 peels are as follows:

| Adhesive | peel strength, 1 peel (g/in) | peel strength, 100 peels (g/in) |
|---|---|---|
| a | 12 | — |
| b | 13 | 8 |
| c | 10 | 8 |
| d | 50 | 12 |
| e | 66 | 44 |
| f | 9 | 5 |
| g | 35 | 30 |

| Invention Example | First adhesive | Second adhesive |
|---|---|---|
| 1 | a | g |
| 2 | b | g |
| 3 | c | g |
| 4 | f | g |
| 5 | a | e |
| 6 | b | e |
| 7 | c | e |
| 8 | f | e |
| 9 | f | d |

What is claimed is:

1. An article of manufacture comprising (i) a plurality of sheets comprising an upper sheet and a lower sheet, said sheets being releasably bonded together by a first adhesive applied over a portion of the adjacent surfaces of said sheets, the remainder of the adjacent surfaces of said sheets being free of said first adhesive, and (ii) a second adhesive applied over a portion of the surface of said bottom sheet opposite the surface to which said first adhesive is applied, the remainder of said surface of said bottom sheet being free of said second adhesive, wherein said second adhesive has a peel strength greater than said first adhesive.

2. The article of claim 1 wherein said first and second adhesives are pressure-sensitive adhesives.

3. The article of claim 1 wherein the peel strength of said second adhesive is at least 150% of the peel strength of said first adhesive.

4. The article of claim 1 wherein said plurality of sheets have substantially the same width and length.

5. The article of claim 1 wherein said plurality of sheets are comprised of paper.

6. The article of claim 1 further comprising a substrate removably bonded to said bottom sheet by said second adhesive.

7. The article of claim 6 wherein said substrate is of substantially the same width and length as said plurality of sheets.

8. The article of claim 6 wherein said substrate is comprised of paper.

9. The article of claim 6 wherein said substrate is comprised of a material selected from the group consisting of plastic, wood and metal.

10. The article of claim 1 wherein said plurality of sheets have a printed surface.

11. The article of manufacture of claim 1 which is a note pad.

* * * * *